United States Patent [19]

Corry

[11] Patent Number: 4,457,669

[45] Date of Patent: Jul. 3, 1984

[54] JIBE MILL

[76] Inventor: William R. Corry, 3616 Mattison, Fort Worth, Tex. 76107

[21] Appl. No.: 954,081

[22] Filed: Oct. 24, 1978

[51] Int. Cl.³ .............................................. F03D 7/06
[52] U.S. Cl. .................... 416/119; 416/132 B
[58] Field of Search .............. 416/132 B, 240 A, 119, 416/142, 52

[56] References Cited

U.S. PATENT DOCUMENTS

| | | | |
|---|---|---|---|
| 82,307 | 9/1868 | Goodale | 416/119 |
| 242,211 | 5/1881 | McIlvaine | 416/119 X |
| 257,649 | 5/1882 | Bragdon | 416/52 |
| 509,866 | 12/1893 | Bradford | 416/119 X |
| 535,602 | 3/1895 | Sherman | 416/240 A |
| 1,139,103 | 5/1915 | Clade | 416/119 |
| 1,171,584 | 2/1916 | Blakely | 416/240 A X |
| 1,804,493 | 5/1931 | Benjamins | 416/240 |
| 1,836,693 | 12/1931 | Urfer | 416/119 |
| 2,319,286 | 5/1943 | Andresen | 416/240 A |
| 3,918,839 | 11/1975 | Blackwell et al. | 416/240 A |
| 3,995,170 | 11/1976 | Graybill | 290/55 |
| 4,105,363 | 8/1978 | Loth | 416/23 X |

FOREIGN PATENT DOCUMENTS 929721  1/1948  France .............................. 416/52

Primary Examiner—Everette A. Powell, Jr.
Attorney, Agent, or Firm—Cushman, Darby & Cushman

[57] ABSTRACT

A sail-type windmill providing high torque without limitations to size. Three sails are mounted to a frame for rotation about an axis generally parallel to the planes of the sails. In one version, the sails are flexible and sheets are provided for mounting the sails. Roller reefing is provided for modifying the effective area each sail member presents to the wind, including a spring biased weight associated with each sail and a line extending from the weight for effecting take-up and let-out of the sail and the sheet in response to radial movement of the weight. In another version, the sails are of metal and speed governing is provided by hydraulic cylinders operatively mounted to the sails for pivoting them about their axes of rotation, the hydraulic cylinders controlled by a aerometer mounted atop the windmill. The frame structure of the windmill can be mounted for rotation about a central shaft, or about a circular track with rollers from the frame engaging the circular track, and a power takeoff being associated with the circular track.

9 Claims, 7 Drawing Figures

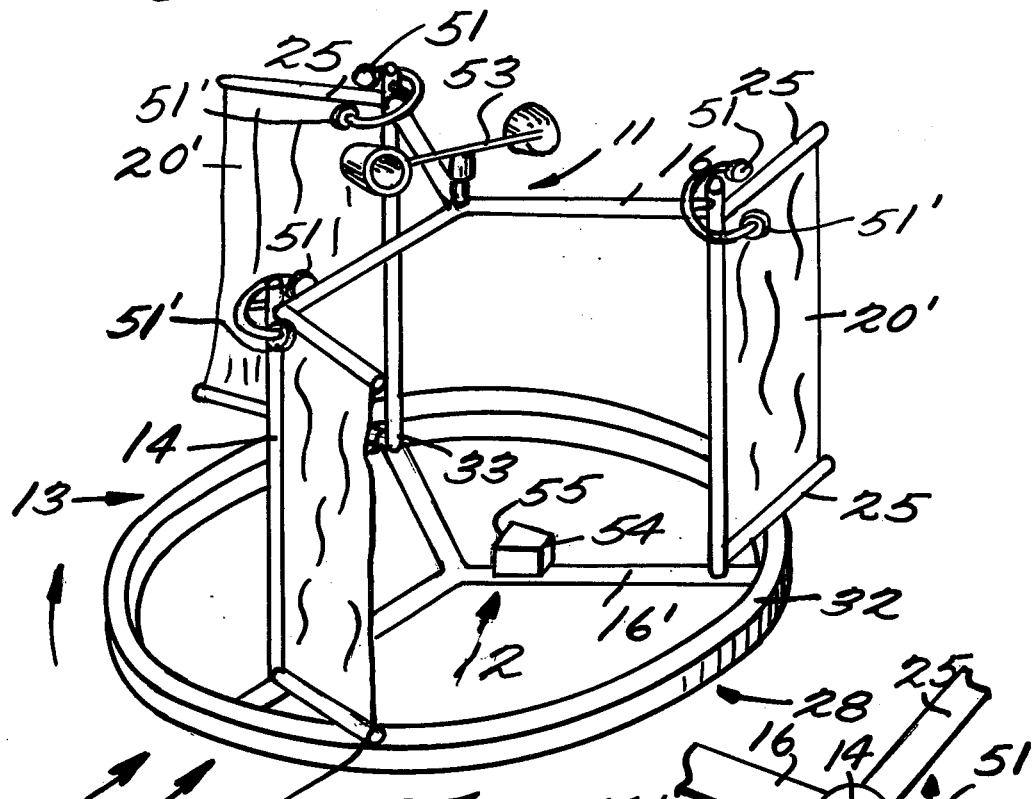
Fig. 5a.
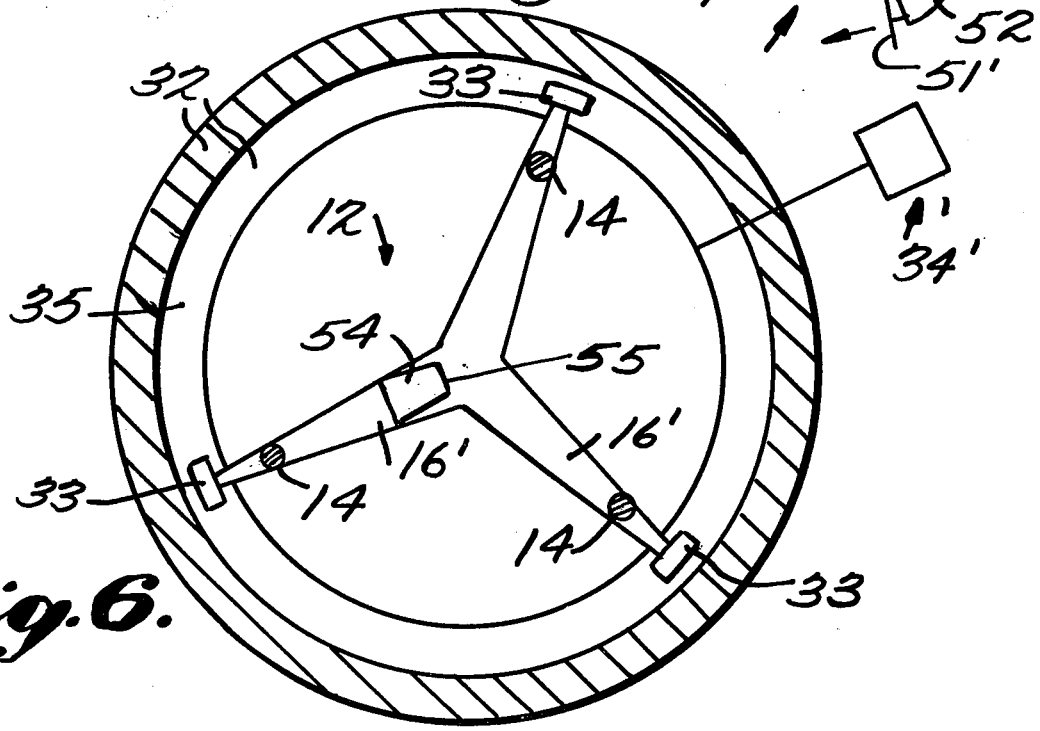
Fig. 5b.
Fig. 6.

JIBE MILL

BACKGROUND AND SUMMARY OF THE INVENTION

The invention relates to a windmill generally of the sail-type, of the same general class as the windmill shown in U.S. Pat. No. 3,995,170.

According to the present invention, it is desired to provide a windmill that provides a high torque without limitations as to size, and which provides maximum efficiency, is easy and inexpensive to construct, and provides "self-reefing", so that it will not be damaged in high winds.

According to the preferred embodiment of the present invention, a windmill is provided that includes a frame having upper and lower frame sections and a plurality of symmetrically disposed mast sections interconnecting the upper and lower frames. While normally the windmill according to the present invention will be a vertical axis windmill, in fact it can have a horizontal axis, or a wide variety of other orientations of its axis of rotation, therefore it is to be understood that the terms "upper" and "lower" as used in the present specification and claims are for reference only, and do not limit the invention to a vertical axis disposition.

The preferred embodiment of the invention further comprises a plurality of substantially quadrate sail members, consisting of three sail members, with the sail members operatively attached to at least one mast section so that they may assume different orientations with respect to each said mast section. The frame is mounted for rotational movement about an axis parallel to the mast sections, the mounting means comprising a central shaft or a stationary circular track with cooperating rollers on the lower frame, and means are provided for transforming rotational movement of the frame into a useful energy form such as electrical energy, mechanical pumping, or the like.

In one embodiment of the invention, the sail members are flexible and are operatively attached to sail masts along one longitudinal edge thereof, and are attached by sheets along the opposite longitudinal edge thereof to sheet masts, each sheet mast being disposed between two sail masts and vice versa. The frame also preferably includes a plurality of spokes, one extending from a central portion of the upper or lower frame section to a mast. Self-reefing is provided for modifying the effective area each sail member presents to the wind in response to wind velocity ("shortening" the sail as wind velocity increases) by means for mounting each of the mast sections for rotation with respect to the upper and lower frame sections about an axis concentric with each mast section, means for mounting each sheet to each sheet mast to take-up and let-out the sheet length in response to rotation of each sheet mast, the means for attaching each sail member to each sail mast providing means for effecting take-up and let-out of the amount of sail in response to rotation of each sail mast, and centrifugal responsive means for effecting coincident rotation of the sail and sheet mast in response to the speed of rotation of the frame. The centrifugal responsive means comprise a weight operatively associated with each lower sheet spoke and a spring for biasing each weight to a predetermined radial position with respect to the lower sheet spoke, a line connected at both ends thereof to the weight and extending around a capstain rigidly attached to the sail mast, a capstain rigidly attached to the sheet mast, and a roller mounted at a radially inward location between the lower sail and sheet spokes. As the velocity of the frame increases, each weight moves radially outward against the bias of the spring to "shorten" the sail associated therewith, and then returns to a more inward radial position under the influence of the spring as the speed of rotation of the frame decreases.

According to another embodiment of the invention, the sails are formed of flexible metal or the like, and each sail is mounted to a sail mast for pivotal movement about the sail mast along the axis of the sail mast by boom means. Speed governing of the windmill is provided by a plurality of hydraulic or pneumatic cylinders, at least one associated with each sail mast and including a pair of stops associated with the boom means for restricting the freedom of movement between about 0° and about 280°. The hydraulic or pneumatic cylinders are controlled by an aerometer which controls a fluid pressure source to effect extension or retraction of the cylinder piston.

It is the primary object of the present invention to provide an efficient, relatively inexpensive, windmill that provides high torque without limitations on size. This and other objects of the invention will become clear from an inspection of the detailed description of the invention, and from the appended claims.

BRIEF DESCRIPTION OF THE DRAWINGS

FIG. 5a is a perspective schematic view of another embodiment according to the present invention, and 5b is a top detail view of the stops associated with each sail mast of FIG. 5a;

FIG. 6 is a view taken just above the lower frame section of the windmill of FIG. 5a and showing the stationary circular track assembly for supporting the windmill for rotation.

DETAILED DESCRIPTION OF THE DRAWINGS

Figure 1:
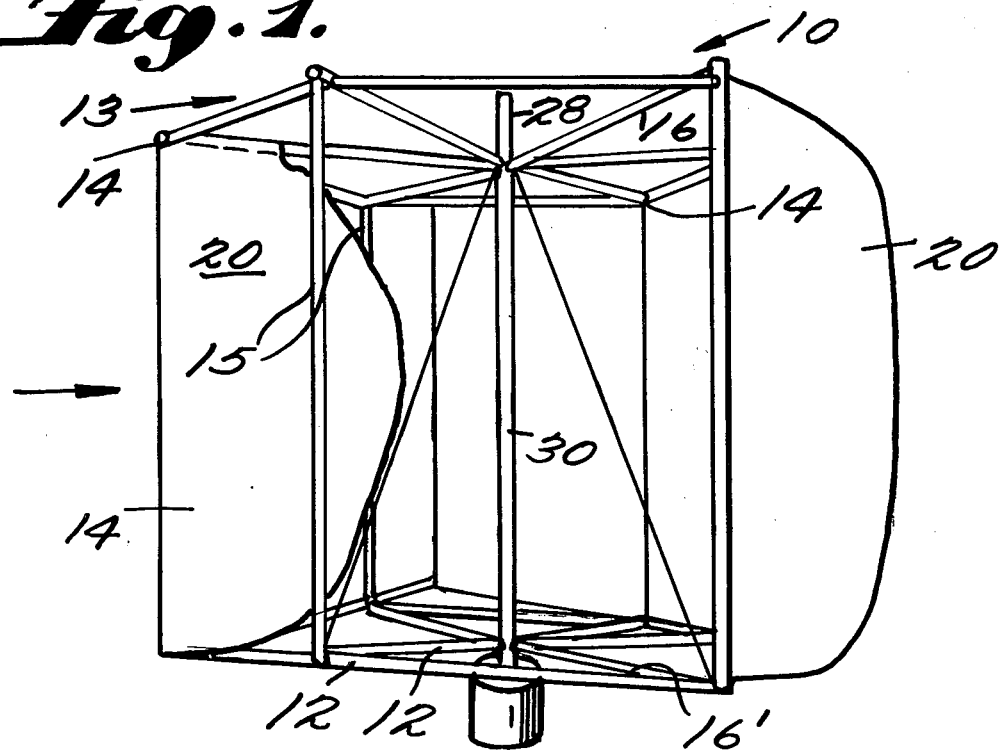
FIG. 1 is a schematic perspective view of an exemplary windmill according to the present invention, with the self-reefing means removed for clarity.

The windmill according to the present invention comprises a frame 10, including upper and lower frame sections 11, 12, respectively, and a plurality of symetrically disposed mast sections, indicated generally by a reference numeral 13, interconnecting the upper and lower frame sections 11, 12, so that they are substantially parallel to each other with the mast sections 13 substantially transverse to the planes defined by the upper and lower frame sections 11, 12. In the embodiment of FIGS. 1 through 4, the mast sections 13 comprise a plurality of sail masts 14, and a plurality of sheet masts 15, a sheet mast 15 disposed between two sail masts 14, and vice versa. In the embodiment of FIGS. 5a, 5b, and 6, the mast sections 13 comprise only the plurality of sail masts 14, In the FIGS. 1 through 4 embodiment, to provide structural integrity, the frame 10 also preferably comprises a plurality of spokes extending from a central location to the upper frame section, and the lower frame section. The upper frame section 11 has a plurality of sail spokes 16 associated therewith, and a plurality of sheet spokes 17 associated therewith, a sail spoke 16 being disposed between two sheet spokes 17 and vice versa, and the lower frame section 12 has corresponding sail and sheet spokes 16', 17' (see and compare FIGS. 2 and 3 especially). In the FIGS. 5a, 5b, and embodiment, the upper frame 11 comprises only the spokes 16, and the lower frame 12 the spokes 16'.

The windmill according to the present invention further comprises a plurality of substantially quadrate sail members 20, 20'. In the embodiment of FIGS. 1 through 4, the sail members 20 are of flexible material (e.g., canvas or nylon), while in the embodiment of FIGS. 5 and 6 the sails 20' are of flexible metal (such as stainless steel or aluminum) or flexible plastic. In order to provide maximum efficiency, according to the preferred embodiment of the invention exactly three sails 20, 20', are provided. By providing three sails, the "empty" space between the sails presented to the wind allows the wind to enter and strike the "lee" sail which has just jibed; with particular reference to FIG. 2, the "empty" space between the sails 20 allows the wind W to enter and strike the left-most sail 20 in FIG. 2, which sail has just jibed, and is "lee" (the arrows A indicate the direction of rotation of the windmill). When three sails 20, are provided, three masts 14 and three masts 15 are provided, and preferably at least 6 spokes 16, 17, and 16', 17', are provided associated with each of the upper and lower frame sections 11, 12, respectively.

The sails 20,20', are operatively attached to at least one mast section 13, the means for operatively attaching each sail member to at least one mast section 13 being provided so that the sail member 20,20', may assume different orientations with respect to the mast sections 13, and so that a longitudinal edge (L-see FIGS. 4 and 5a)thereof remains generally parallel to each of the mast sections 13 despite the orientation of the sail member 20,20'. In the FIG. 1 through 4 embodiment, the means for operatively attaching each sail member 20 to a sail mast 14 comprises a sleeve forming a first longitudinal edge of each sail member 20 (opposite the edge L) for receiving the sail mast 14 therein, and at least one sheet 24 (two are shown in the drawing) attached to the second longitudinal edge L of each sail member 20 opposite the first edge, and attached to a sheet mast 15 operatively associated with the sail mast 14 on which the sail 20 is disposed. In the embodiment of FIGS. 5a, 5b, and 6, the means for operatively attaching the sail member 20' to at least one sail mast 14 comprises boom means including a pair of booms 25 extending from each sail mast 14, one boom 25 of each pair extending from a top portion of its respect sail mast 14, and one boom 25 of each pair extending from a bottom portion of its respective sail mast 14. The booms 25 of each pair are disposed in a common plane substantially transverse to the planes defined by the upper and lower frame sections 11, 12, and the booms are mounted for rotational movement with respect to—but not axial movement along—the sails masts 14.

Figure 4:
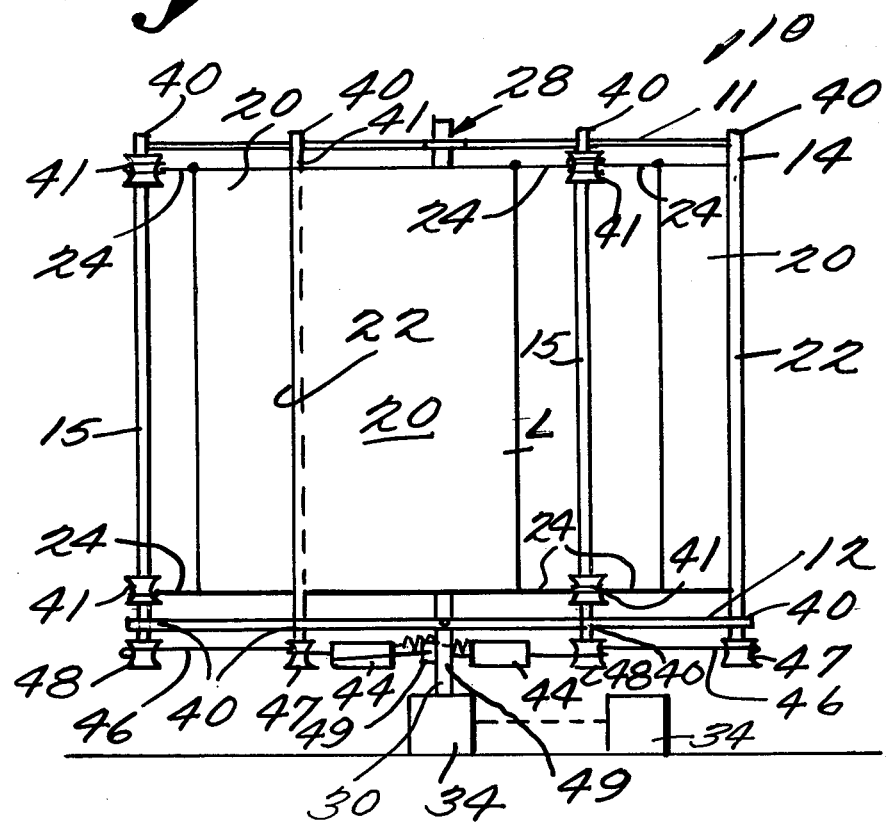
FIG. 4 is a side view of the windmill of FIG. 3, again showing the self-reefing means in detail.
Figure 2:
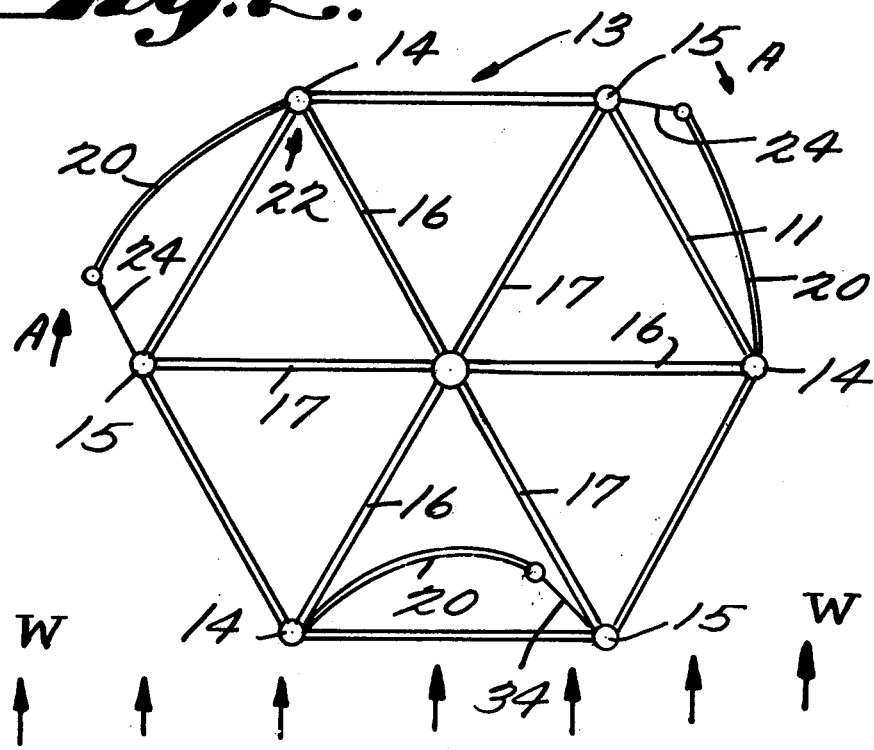
FIG. 2 is a top plan view of the windmill of FIG. 1.

The windmill according to the present invention further comprises—as shown generally at 28 in FIGS. 4 and 5a—means for mounting the frame 10 for rotational movement about an axis parallel to the mast sections 13 (i.e., about the axis connecting the geometric center of the upper frame section 11 and the lower frame section 12). In the FIGS. 1 through 4 embodiment, the means 28 comprises a central shaft 30 defining the axis of rotation, the spokes 16, 16', 17, 17', connected between the central shaft 30 and the upper and lower frame sections 11, 12, and in the FIGS. 5a, 5b, and 6 embodiment the mounting means 28 comprises a stationary circular track 32 with roller means 33 associated with the lower frame section 12 for providing relative rotation of the frame 10 with respect to the circular track 32. If desired, the circular track 32 and roller means 33 arrangement can be associated with the windmill embodiment of FIGS. 1 through 4, and likewise the central shaft 30 can be associated with the windmill embodiment of FIGS. 5a, 5b, and 6.

The windmill further comprises means for transforming rotational movement of the frame 10 into a useful energy form. Such means are shown diagrammatically at 34 and 34' in FIGS. 4 and 6, respectively. The means 34, 34' can comprise any suitable energy transformation arrangement, such as electric or mechanical energy conversion means. For instance, the means 34 may comprise a conventional electric generator gear connected to the central shaft 30. The means 34' comprises a power takeoff associated with the stationary circular track 32, or lower frame 12, and may be mechanical or electrical. If an electrical takeoff is desired, the tips of the spokes 16', conecting the spokes to the roller means 33 (and the roller means 33 themselves) may be permanent magnets comprising an armature, and windings—indicated diagrammatically at 35—may be associated with the stationary circular track 32 so that direct electrical generation is provided. Alternatively, the spoke tips, or the spokes 16' themselves, could activate hydraulic pumps, gears, pneumatic pumps, or the like for the generation of mechanical energy, such as by the spokes 16', tuning gear wheels adapted to cooperate therewith as the spokes rotate.

A significant feature of the present invention is the provision of self-reefing means for modifying the effective area each sail member 20, 20', presents to the wind in response to wind velocity.

Figure 3:
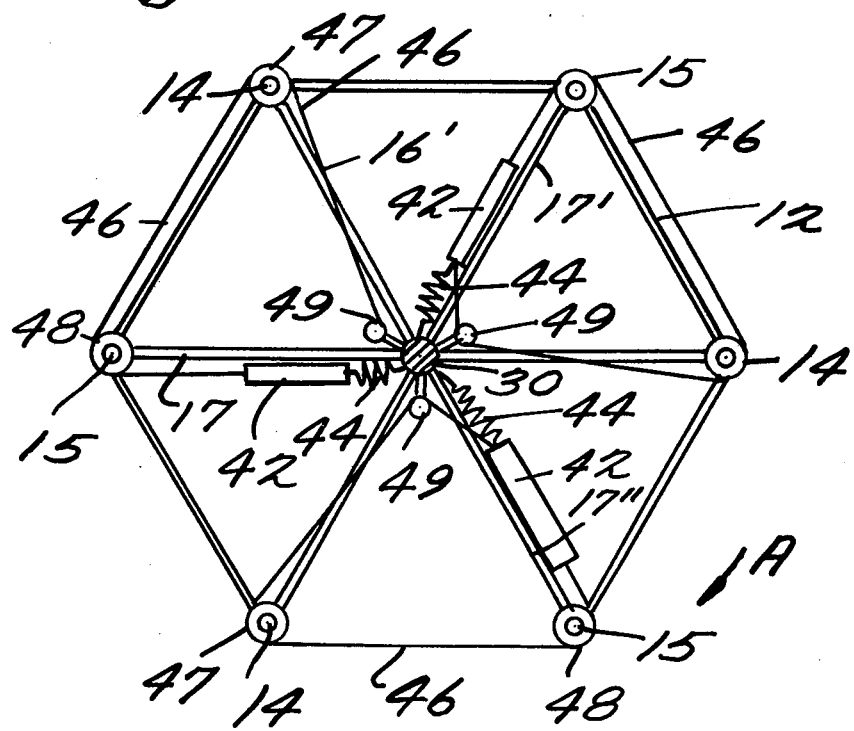
FIG. 3 is a view of the windmill of FIGS. 1 and 2 viewed from just above the lower frame section, and showing the self-reefing means in detail.

The preferred self-reefing means according to the present invention associated with the flexible sail 20 embodiment of the present invention is shown most clearly in FIGS. 3 and 4. The self-reefing means includes roller bearing means 40 (see FIG. 4) for mounting each of the mast sections 13 for rotation with respect to the upper and lower frame sections 11, 12, about an axis concentric with each mast section 13; means for mounting each sheet to each sheet mast to take-up and let-out the sheet length in response to rotation of each sheet mast; providing the sleeve 22 for attaching each sail member 20 to each sail mast 14 so that it effects take-up and let-out of the amount of sail in response to rotation of each of the sail masts 14; and centrifugal responsive means for effecting coincident rotation of the sail and sheet masts 14, 15, in response to the speed of rotation of the frame. The means for mounting each sheet to each sheet mast to take-up and let-out the sheet length comprises a spool 41 (see FIG. 4) associated with each sheet 24 and rigidly affixed to its associated sheet mast 15. The centrifugal means comprises a weight 42 operatively associated with each lower sheet spoke 17', means for biasing each weight to a predetermined radial position with respect to each lower sheet spoke 17' (such means provided by a coil spring 44 or the like operatively connected between the weight 42 and the central shaft 30); and means for effecting rotation of each sail mast 14 and its cooperating sheet mast 15 in response to the change in radial position of the weight 42 against the bias of the spring 44. The rotation effecting means comprises a line 46 (such as a wire rope, chain, hydraulic loop, or the like) connected at both ends thereof to the to the weight 42 (see FIG. 3), and extending around a capstain or the like (i.e., sprocket) 47 rigidly attached to the sail mast 14, a capstain or the like (i.e., sprocket) 48 rigidly attached to the sheet mast 15, and a rotatable means 49 mounted at a radially inward location between the lower sail and sheet spokes. The structures 47, 48, and 49 are all mounted below the lower frame section 12 (see FIG. 4). The exact nature of the rotatable means 49 that will be provided depends upon the configuration of the line 46, and can comprise a simple roller, pulley, sprocket, or the like. The rotatable means 49 is attached to the central shaft 30, and mounted for rotation about an axis parallel to the axis of rotation of the central shaft 30.

In the FIGS. 5a, 5b, and 6 embodiment, the "self-reefing" means comprises a speed governing means for allowing pivoting the sail members 20' about their axes (14) in response to wind velocity, the speed governing means including a pair of stops 51, 51' associated with at least one of the booms 25 or each pair of booms, and fluid-cylinder means (such as a conventional hydraulic rotary actuator) 52 mounted near the top of each sail mast 14 for varying the angular position of the stops 51, 15' associated with each sail mast 14 from about 0° to about 280° [280° spacing is shown in FIG. 5b]; and means for actuating the cylinders 52 in response to wind velocity. The actuating means preferably comprises an aerometer 53 mounted atop the frame 10. The aerometer 53 is operatively connected to a hydraulic or pneumatic control arrangement 54 or the like mounted on the frame 10 (see FIG. 5), which in turn is operatively connected to the cylinders 52 as is hydraulic accumulator 55. Other suitable control assemblies and arrangements also may be provided.

Operation

Exemplary apparatus according to the present invention having been described, a typical manner of operation thereof will now be set forth.

With respect to FIGS. 1 through 4, when the wind W (see FIG. 2 in particular) blows, at least one of the flexible sails 20 catches the wind, and the force of the wind is transformed into rotation of the frame 10 and central shaft 30 about the axis defining the central shaft 30, rotation being effected in direction A. Because of the provision of three sails, spaced as illustrated, the wind W enters the "empty" space between the sails and strikes the "lee" sail (left-most sail on FIG. 20) which has just jibed, while the right-most sail 20 in FIG. 2 becomes limp and transfers over to an inward position (like the middle sail 20 in FIG. 2), and rotation continues in that manner. The rotation of the central shaft 30 is transformed into electrical energy, or other useful forms of energy, by the means 34. As the wind velocity increases, the sails 20 reef, the sails 20 automatically being "shortened". As the speed of rotation of the frame 10 increases responsive to the wind velocity, the weights 42 move radially outwardly (see FIG. 3) against the bias of biasing means 44, the line 46 effecting rotation of the masts 14, and 15, due to its engagement with the capstains (or the like) 47, 48. Rotation of shaft 14 in response to radially outward movement of the weight 42 results in the sail 20 being rolled up on the shaft 14 while rotation of the shaft 15 in response to radial movement of the weight 42 results in the sheets 24 being let out. As the velocity of the frame 10 decreases, the weight 42 moves radially inwardly responsive to the bias of the spring 44, effecting rotation of the shafts 14, 15, to unfurl the sail 20 and take in the sheets 24.

In the FIGS. 5a, 5b, and 6 embodiment, the wind impacting the sails 20' effects rotation of the frame 10, the rollers 33 attached to the lower frame section 12 riding on the stationary circular track 32, and electrical energy or other useful energy being "taken-off" from the circular track 32 by the means 34'. The wind velocity is sensed by the aerometer 53, and the aerometer 53 through hydraulic controller 54, accumulator 55, and cylinders 52 allows relative degrees of freedom of movement of the booms 25 with respect to the sail mast 14 from about 0° to about 280°. When the wind is relatively mild, the cylinders 52 control the stops 51, 51' so that each boom 25 may pivot about 90° about the sail mast 14 with which it is associated, as indicated generally in FIG. 5a. When the wind gets much stronger, the cylinders 52 control the stops 51, 51' so that the booms 25 essentially cannot move at all with respect to the masts 14 (0°). When the wind velocity becomes so high that it could damage the windmill, however, the cylinders 52 move the stops generally to the position indicated in FIG. 5b (about 280°) so that all the sails vane into the wind and the mill ceases to rotate (see the arrows indicating gale force wind direction in FIG. 5b). As wind velocity drops to an acceptable level, the aerometer 53 signals the accumulator 55 to release its stored energy which reengages the stops 51, 51' to move the booms 25 and the sails 20' connected thereto back into working position.

While the invention has been herein shown and described, in what is presently conceived to be the most practical and preferred embodiment thereof, it will be apparent to those of ordinary skill in the art that many modifications may be made thereof within the scope of the invention. For instance, if the structural integrity is otherwise sufficient, sheet or support masts 15, 15', need not extend the entire length between the upper and lower frame sections 11, 12, but rather need only extend a sufficient distance to support the spools 41 or the like, or the cylinders 26, respectively. Alternatively, the sheets 24 could be directly connected to the upper and lower frames 11, 12, respectively (where self-reefing was not a requirement). Other modifications will also present themselves to those skilled in the art, thus it is intended that the present invention be given the broadest interpretation of the appended claims so as to encompass all equivalent structures and devices.

What is claimed is:

1. A windmill comprising:
a frame, said frame comprising upper and lower frame sections, and six symmetrically disposed mast sections interconnecting said upper and lower frame sections so that said upper and lower frame sections are substantially parallel to each other with said mast sections substantially transverse to planes defined by said upper and lower frame sections, three of said mast sections comprising sail masts, and three of said mast sections comprising sheet masts, each sheet mast being disposed between two sail masts, and vice versa, and said frame further comprising six spokes extending from each of said upper and lower frame sections, each spoke extending to a mast section, three of the spokes extending from each of said upper and lower frame sections comprising sail spokes, and three of the spokes extending from each of said upper and lower frame sections comprising sheet spokes, each sail spoke being disposed between two sheet spokes, and vice versa;

a plurality of substantially quadrate sail members of flexible material, consisting of three sail members;

means for operatively attaching each sail member to at least one mast section so that it may assume different orientations with respect to each said mast section; so that the sail members may jibe and without blockage of wind to the lee sail; and so that a longitudinal edge of each sail member remains generally parallel to each said mast section despite the orientation thereof, said means for operatively attaching each sail member to at least one mast section comprises a sleeve forming a first longitudinal edge of each sail member and receiving a sail mast therein, and a sheet attached to a second longitudinal edge of each sail member, opposite said first edge, and attached to a sheet mast adjacent the sail mast to which the sail member is attached;

means for mounting said frame for rotational movement about an axis parallel to said mast sections, in response to wind;

means for transforming rotational movement of said frame into a useful energy form; and self-reefing means for modifying the effective area each sail member presents to the wind in response to wind velocity, said self-reefing means comprising: means for mounting each of said mast sections for rotation with respect to said upper and lower frame sections about an axis concentric with each mast section; means for mounting each said sheet to each sheet mast to take-up and let-out the sheet length in response to rotation of each said sheet mast; each said sleeve for attaching each said sail member to each said sail mast providing means for effecting take-up and let-out of the amount of sail in response to rotation of each said sail mast; and centrifugal responsive means for effecting coincident rotation of said sail and sheet masts in response to the speed of rotation of said frame.

2. A windmill as recited in claim 1 wherein said centrifugal responsive means comprises a weight operatively associated with each lower sheet spoke and means for biasing each said weight to a predetermined radial position with respect to said lower sheet spoke; and means for effecting rotation of a sail mast and its cooperating sheet mast in response to the change in radial position of said weight, against the bias of said biasing means.

3. A windmill as recited in claim 2 wherein each said rotation effecting means comprises a line connected at both ends thereof to said weight and extending around a capstain or the like rigidly attached to said sail mast, a capstain or the like rigidly attached to said sheet mast, and a rotatable means mounted at a radially inward location between said lower sail and sheet spokes.

4. A windmill as recited in claim 2 wherein said means for mounting said frame for rotational movement comprises a central shaft defining said axis of rotation, said spokes connected between said central shaft and said upper and lower frame sections, and wherein each said means for biasing a said weight to a predetermined radial position with respect to said lower sheet spoke comprises a spring interconnected between said central shaft and said weight.

5. A windmill comprising:
a frame, said frame comprising upper and lower frame sections, and a plurality of symmetrically disposed mast section interconnecting said upper and lower frame sections so that said upper and lower frame sections are substantially parallel to each other with said mast sections substantially transverse to planes defined by said upper and lower frame sections, a plurality of said mast sections comprising sail masts, and a plurality of said mast sections comprising sheet masts, each sheet mast being disposed between two sail masts and vice versa; a plurality of substantially quadrate sail members of flexible material; means for operatively attaching each sail member to a sail mast so that it may assume different orientations with respect to said sail mast, and so that a longitudinal edge thereof remains generally parallel to said sail mast despite the orientation thereof, said operatively attaching means comprising a sleeve forming a first longitudinal edge of each sail member and receiving said sail mast therein, and a sheet attached to a second longitudinal edge of each sail member, opposite said first edge, and attached to a sheet mast adjacent the sail mast to which the sail member is attached; a plurality of spokes extending from each of said upper and lower frame sections, each spoke extending to a mast section and comprising sail spokes and sheet spokes, each sail spoke being disposed between two sheet spokes, and vice versa; means for mounting said frame for rotational movement about an axis parallel to said mast sections sections in response to wind; and means for transforming rotational movement of said frame into a useful energy form; wherein the improvement comprises self-reefing means for modifying the effective area each sail member presents to the wind in response to wind velocity, said self-reefing means comprising means for mounting each of said mast sections for rotation with respect to said upper and lower frame sections about an axis concentric with each mast section; means for mounting each said sheet to each said sheet mast to take up and let out the sheet length in response to rotation of each said sheet mast; each said sleeve for attaching each said sail member to each said sail mast providing means for effecting take-up and let-out of the amount of sail in response to rotation of each said sail mast; and centrifugal responsive means for effecting coincident rotation of said sail and sheet masts in response to the speed of rotation of said frame.

6. A windmill as recited in claim 5 wherein said centrifugal responsive means comprises a weight operatively associated with each lower sheet spoke and means for biasing each said weight to a predetermined radial position with respect to said lower sheet spoke; and means for effecting rotation of sail mast and its cooperating sheet mast in response to the change in radial position of said weight, against the bias of said biasing means.

7. A windmill as recited in claim 6 wherein each said rotation effecting means comprises a line connected at both ends thereof to said weight and extending around a capstain or the like rigidly attached to said sail mast, a capstain or the like rigidly attached to said sheet mast, and a rotatable means mounted at a radially inward location between said lower sail and sheet spokes.

8. A windmill as recited in claim 6 wherein said means for mounting said frame for rotational movement comprises a central shaft defining said axis of rotation, said spokes connected between said central shaft and said upper and lower frame sections, and wherein each said means for biasing a said weight to a predetermined radial position with respect to said lower sheet spoke comprises a spring interconnected between said central shaft and said weight.

9. A windmill as recited in claim 5 wherein said means for mounting said frame for rotational movement about an axis parallel to said mast sections comprises a stationary circular track, roller means associated with said lower frame section for providing relative rotation of said frame with respect to said circular track; and wherein said means for transforming rotational movement of said frame into a useful energy form comprises power takeoff means associated with said stationary circular track.

* * * * *